United States Patent
Reeser

(10) Patent No.: US 9,451,040 B2
(45) Date of Patent: *Sep. 20, 2016

(54) SYSTEM AND METHOD FOR SELECTIVELY CACHING HOT CONTENT IN A CONTENT DISTRIBUTION NETWORK

(71) Applicant: AT&T Intellectual Property I, L.P., Atlanta, GA (US)

(72) Inventor: Paul K. Reeser, Red Bank, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,836

(22) Filed: Feb. 2, 2015

(65) Prior Publication Data

US 2015/0149580 A1    May 28, 2015

Related U.S. Application Data

(63) Continuation of application No. 14/077,664, filed on Nov. 12, 2013, now Pat. No. 8,959,179, which is a continuation of application No. 13/542,104, filed on Jul. 5, 2012, now Pat. No. 8,583,762, which is a continuation of application No. 12/270,633, filed on Nov. 13, 2008, now Pat. No. 8,239,482.

(51) Int. Cl.
| | |
|---|---|
| *G06F 15/16* | (2006.01) |
| *H04L 29/08* | (2006.01) |
| *G06F 17/30* | (2006.01) |
| *H04L 29/06* | (2006.01) |

(52) U.S. Cl.
CPC ......... *H04L 67/28* (2013.01); *G06F 17/30902* (2013.01); *H04L 67/2852* (2013.01); *H04L 69/28* (2013.01)

(58) Field of Classification Search
CPC ............ G06F 3/0608; G06F 12/0888; G06F 2201/81; G06F 3/0631
See application file for complete search history.

(56) References Cited

U.S. PATENT DOCUMENTS

| | | | |
|---|---|---|---|
| 6,088,718 A | 7/2000 | Altschuler et al. | |
| 6,425,057 B1 | 7/2002 | Cherkasova et al. | |
| 6,493,810 B1 * | 12/2002 | Pang .................. | H04L 67/2852 711/130 |

(Continued)

OTHER PUBLICATIONS

"Level 3 Content Delivery for Extended Libraries Service," Level 3 Communications, 2008, www.level3.com.

(Continued)

*Primary Examiner* — Djenane Bayard
(74) *Attorney, Agent, or Firm* — Akerman LLP; Mammen (Roy) P. Zachariah, Jr.; Michael K. Dixon

(57) ABSTRACT

A method includes altering a request interval threshold when a cache-hit ratio falling below a target, receiving a request for content, providing the content when the content is in the cache, when the content is not in the cache and the time since a previous request for the content is less than the request interval threshold, retrieving and storing the content, and providing the content to the client, when the elapsed time is greater than the request interval threshold, and when another elapsed time since another previous request for the content is less than another request interval threshold, retrieving and storing the content, and providing the content to the client, and when the other elapsed time is greater than the other request interval threshold, rerouting the request to the content server without caching the content.

20 Claims, 3 Drawing Sheets

(56) References Cited

U.S. PATENT DOCUMENTS

| | | | |
|---|---|---|---|
| 6,738,866 | B2 | 5/2004 | Ting |
| 7,181,523 | B2 | 2/2007 | Sim |
| 7,512,591 | B2 * | 3/2009 | Bildhaeuser ...... G06F 17/30457 |
| 7,584,294 | B2 | 9/2009 | Plamondon |
| 2002/0073232 | A1 | 6/2002 | Hong et al. |
| 2002/0147895 | A1 * | 10/2002 | Glance .............. G06F 17/30902 711/158 |
| 2005/0033621 | A1 | 2/2005 | Hartmann et al. |
| 2005/0268037 | A1 * | 12/2005 | Hama ................. G06F 11/3452 711/118 |
| 2006/0248195 | A1 | 11/2006 | Toumura et al. |
| 2008/0071859 | A1 | 3/2008 | Seed et al. |
| 2008/0120130 | A1 | 5/2008 | Hartmann et al. |
| 2008/0229027 | A1 | 9/2008 | Shioya et al. |
| 2008/0270536 | A1 | 10/2008 | Keesey et al. |
| 2009/0119329 | A1 | 5/2009 | Kwon et al. |
| 2009/0210431 | A1 | 8/2009 | Marinkovic et al. |
| 2010/0121940 | A1 | 5/2010 | Reeser |

OTHER PUBLICATIONS

"Content Delivery for Extended Libraries (CDXL)," 2008, http://www.level3.com/index.cfm?pageID=38.

* cited by examiner

SYSTEM AND METHOD FOR SELECTIVELY CACHING HOT CONTENT IN A CONTENT DISTRIBUTION NETWORK

CROSS REFERENCE TO RELATED APPLICATIONS

This application is a continuation of U.S. patent application Ser. No. 14/077,664 filed on Nov. 12, 2013 which is a continuation of U.S. patent application Ser. No. 13/542,104 filed on Jul. 5, 2012, now U.S. Pat. No. 8,583,762 which is a continuation of U.S. patent application Ser. No. 12/270,633 filed on Nov. 13, 2008, now U.S. Pat. No. 8,239,482, the disclosures of which are hereby incorporated by reference in their entireties.

FIELD OF THE DISCLOSURE

The present disclosure generally relates to communications networks, and more particularly relates to systems and methods for selectively caching hot content in a content distribution network.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically reroute content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
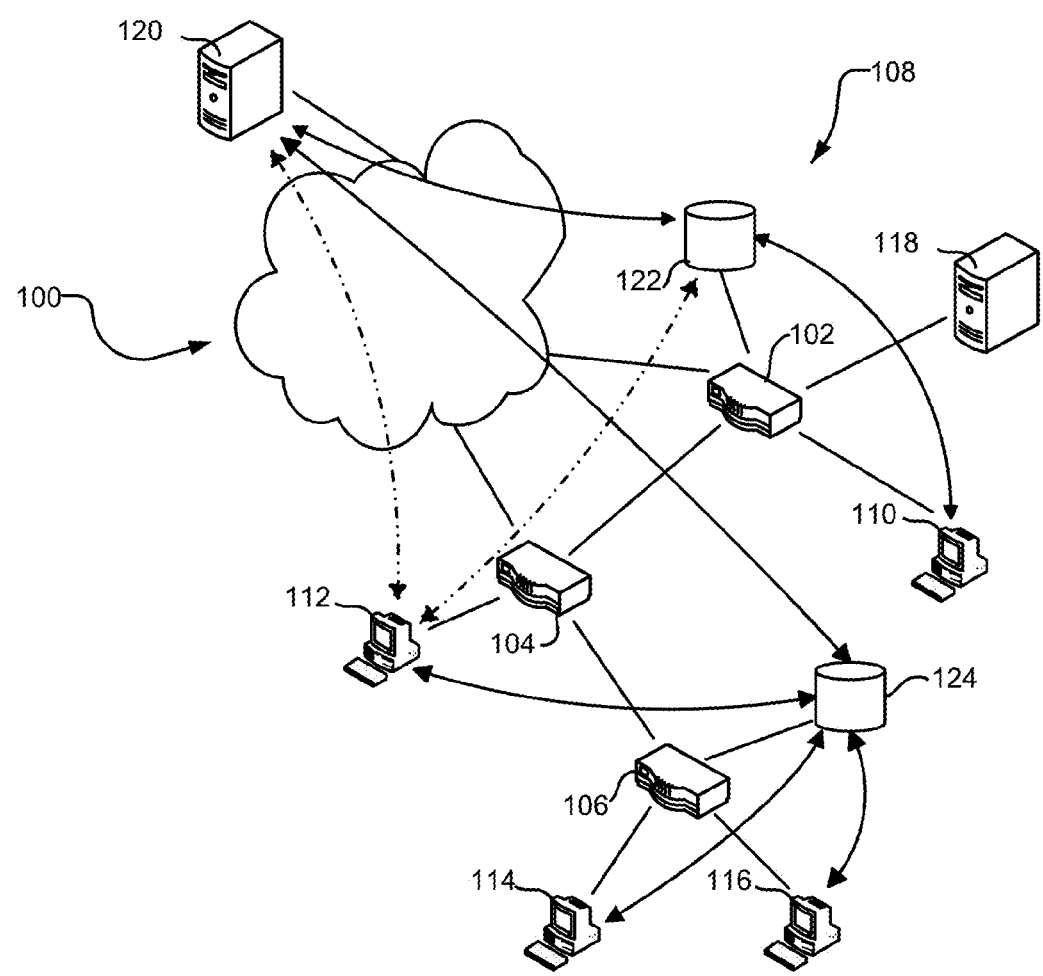
FIG. 1 is a schematic diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 replicating content on the server 120 that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once until the time-to-live (TTL) expires, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114, and can cause cache server 124 performance degradation. To maximize the cost and time savings of providing content from the cache, the most popular content may be stored in the cache, while less popular content is retrieved from server 120.

Figure 2:
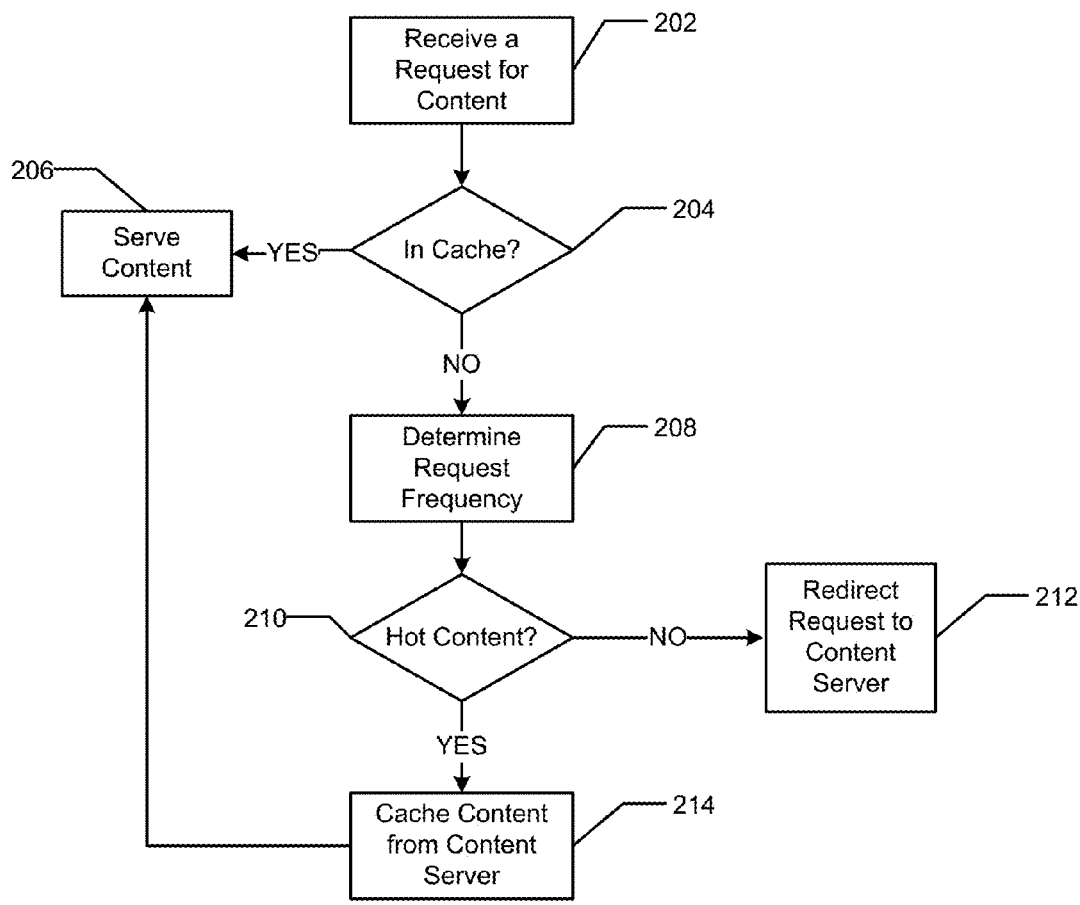
FIG. 2 is a flow diagram illustrating a method of selectively caching hot content.

FIG. 2 shows a method of selectively caching hot content. At 202 a server, such as cache server 122, receives a request for content from a client, such as client system 112. At 204, the server can determine if the content is locally cached. The content may be locally cached if the server has recently received a plurality of requests for the content. The locally cached content may be stored in a memory of the server or in a storage attached to the server. If the content is locally cached, the server can provide the content to the client, as illustrated at 206.

Alternatively, if the content is not locally cached, the server can determine a request frequency for the content, as illustrated at 208. In an embodiment, the request frequency can be established by determining the elapsed time, such as the number of seconds, since a previous request for the content. In an alternate embodiment, the server may determine the elapsed time since the last n previous requests, such as the elapsed time since the last two requests. The elapsed time since the previous request(s) were received can be stored in a table indexed by a content identifier, enabling the server to determine the elapsed time since the previous request(s) relatively quickly, such as by taking the difference between the time the current request was received and the time the previous request was received. Additionally, the server can update the table to include the time of the current request.

At 210, the server can determine if the content is hot content. Hot content can be content that is frequently requested. The server may compare the elapsed time since the previous request(s) to a threshold to determine if the content is hot content. For example, if the elapsed time since the last request is not greater than the last request threshold, the content can be considered hot content. In an embodiment where the server tracks the time since the last n previous requests, the server can compare the elapsed time since each previous request to a corresponding threshold. For example, the server can compare the elapsed time since the next to last request to a second threshold that is larger than the last request threshold. If the elapsed time since any of the previous requests is not greater than the corresponding threshold, the content can also be considered hot content.

At 212, when the content is not hot content, such as when the elapsed time since the previous request is greater than the corresponding threshold, the server can redirect the request to a content server. The content server can be an origin server or a CDN server storing the content, such as another cache server or a distributed storage server known to have the content. In an embodiment, the server may send an HTTP Redirect message to the client indicating that the client should retrieve the content directly from the content server. In an alternate embodiment, the server may act as a non-caching proxy. The server may retrieve the content from the content server and pass the content directly to the client without storing the content in the cache. When the rate at which the content is received from the content server is greater than the rate at which the content is delivered to the client, the server may temporarily store a portion of the content in memory.

Alternatively, at 214, when the content is hot content, such as when the elapsed time(s) since the previous request(s) are less than the corresponding threshold(s), the server may cache the content. The server may retrieve the content from the content server and store the content in the cache. At 206, the server may provide the content to the client. In an embodiment, the server may provide the content to the client substantially simultaneously to storing the content in the cache.

In an embodiment, the last request threshold and the second threshold may be a system wide parameter that is the same for all cache servers and for all content files. Alternatively, multiple threshold values may be defined and applied to different subsets of cache servers and/or different sets of content files. Further, the threshold values may be individually determined for each cache server and each content file. In another embodiment, the threshold can be dynamically determined in response to changes in a cache-hit ratio of the cache server. The cache-hit ratio is the ratio of the number of times content is served from the cache to the number of requests for content. When content is served from the cache, the time required for a client to receive the content is lower. As such, it is preferable for the cache-hit ratio to be relatively large. The server can monitor the cache-hit ratio and adjust the threshold value when the cache-hit ratio drops below a target cache-hit ratio. For example, a low cache-hit ratio may indicate that relatively cold content is replacing relatively hot content already in the cache and the threshold values may be increased to prevent relatively cold content from entering the cache. In a further embodiment, thresholds corresponding to multiple previous requests can be individually altered in response to changes in the cache-hit ratio. For example, the threshold corresponding to the last request may be increased while the threshold corresponding to the second to last request can be held constant.

Figure 3:
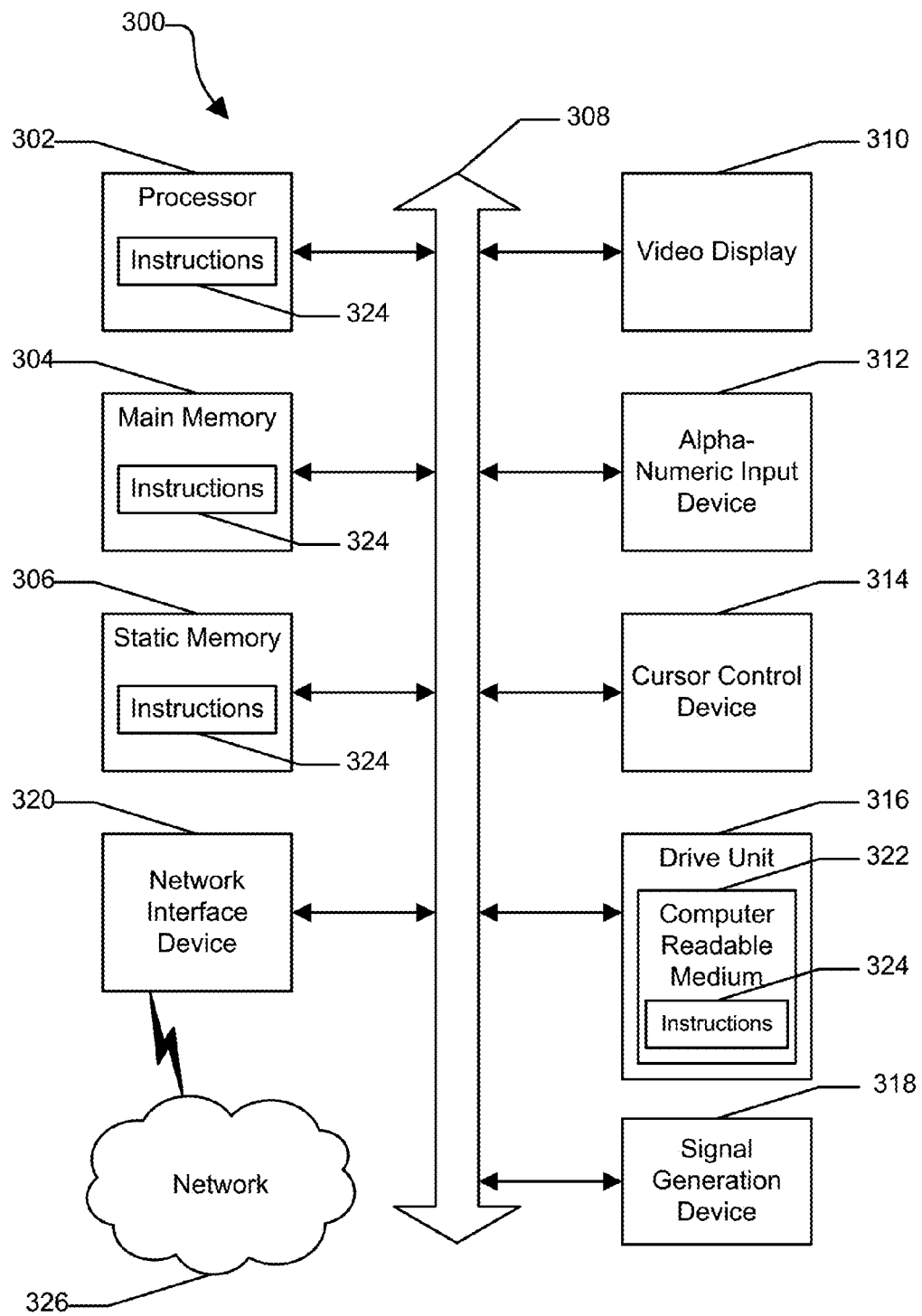
FIG. 3 is an illustrative embodiment of a general computer system.

FIG. 3 shows an illustrative embodiment of a general computer system 300. The computer system 300 can include a set of instructions that can be executed to cause the computer system to perform any one or more of the methods or computer based functions disclosed herein. The computer system 300 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

The computer system 300 may include a processor 302, such as a central processing unit (CPU), a graphics processing unit (GPU), or both. Moreover, the computer system 300 can include a main memory 304 and a static memory 306 that can communicate with each other via a bus 308. As shown, the computer system 300 may further include a video display unit 310 such as a liquid crystal display (LCD), an organic light emitting diode (OLED), a flat panel display, a solid-state display, or a cathode ray tube (CRT). Additionally, the computer system 300 may include an input device 312 such as a keyboard, and a cursor control device 314 such as a mouse. Alternatively, input device 312 and cursor control device 314 can be combined in a touchpad or touch sensitive screen. The computer system 300 can also include a disk drive unit 316, a signal generation device 318 such as a speaker or remote control, and a network interface device 320 to communicate with a network 326. In a particular embodiment, the disk drive unit 316 may include a computer-readable medium 322 in which one or more sets of instructions 324, such as software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
   a memory that stores instructions;
   a processor that executes the instructions to perform operations, the operations comprising:
     determining, in response to a request for content from a client, if the content is in a cache and if a first elapsed time since a first previous request for the content is less than a first threshold;
     storing the first elapsed time in a table indexed by a content identifier;
     if the content is determined to not be in the cache and if the first elapsed time is less than the first threshold:
       retrieving the content;
       storing the content in the cache; and
       providing the content to the client;
     determining a second threshold based on the content requested and based on the cache; and
     if the content is determined to not be in the cache and a second elapsed time since a second previous request for the content is greater than the second threshold:
       obtaining the content for the client without caching the content.

2. The system of claim 1, wherein, if the content is determined to not be in the cache, the first elapsed time is greater than or equal to the first threshold, and the second elapsed time since the second previous request is less than the second threshold, the operations further comprise:
   retrieving the content;
   storing the content in the cache; and
   providing the content to the client.

3. The system of claim 1, wherein the operations further comprise receiving the request for the content from the client.

4. The system of claim 1, wherein the operations further comprise providing the content to the client if the content is determined to be in the cache.

5. The system of claim 1, wherein the operations further comprise determining that the content is hot content if the content is determined to not be in the cache and if the first elapsed time is less than the first threshold.

6. The system of claim 1, wherein the operations further comprise determining that the content is hot content if the content is determined to not be in the cache, the first elapsed time is greater than or equal to the first threshold, and the second elapsed time since the second previous request is less than the second threshold.

7. The system of claim 1, wherein, if the content is determined to not be in the cache and the second elapsed time since the second previous request for the content is greater than the second threshold, the operations further comprise:
delivering the content to the client.

8. The system of claim 7, wherein the operations further comprise storing a portion of the content when a rate at which the content is obtained is greater than a rate at which the content is delivered to the client.

9. The system of claim 1, wherein the operations further comprise determining the first and second thresholds.

10. The system of claim 1, wherein the operations further comprise altering the first and second thresholds in response to a change in a cache-hit-ratio of the cache.

11. A method, comprising:
determining, in response to a request for content from a client, if the content is in a cache and if a first elapsed time since a first previous request for the content is less than a first threshold, wherein the determining is performed by utilizing instructions from memory that are executed by a processor;
storing the first elapsed time in a table indexed by a content identifier;
if the content is determined to not be in the cache and if the first elapsed time is less than the first threshold:
retrieving the content;
storing the content in the cache; and
providing the content to the client;
determining a second threshold based on the content requested and based on the cache; and
if the content is determined to not be in the cache and a second elapsed time since a second previous request for the content is greater than the second threshold:
obtaining the content for the client without caching the content.

12. The method of claim 11, further comprising receiving the request for the content from the client.

13. The method of claim 11, further comprising providing the content to the client if the content is determined to be in the cache.

14. The method of claim 11, further comprising determining that the content is hot content if the content is determined to not be in the cache and if the first elapsed time is less than the first threshold.

15. The method of claim 11, further comprising determining that the content is hot content if the content is determined to not be in the cache, the first elapsed time is greater than or equal to the first threshold, and the second elapsed time since the second previous request is less than the second threshold.

16. The method of claim 11, wherein, if the content is determined to not be in the cache and the second elapsed time since the second previous request for the content is greater than the second threshold, the method further comprises delivering the content to the client.

17. The method of claim 16, further comprising storing a portion of the content when a rate at which the content is obtained is greater than a rate at which the content is delivered to the client.

18. The method of claim 11, further comprising altering the first and second thresholds in response to a change in a cache-hit-ratio of the cache.

19. The method of claim 11, further comprising determining a cache-hit-ratio of the cache.

20. A computer-readable device comprising instructions, which when loaded and executed by a processor, cause the processor to perform operations comprising:
determining, in response to a request for content from a client, if the content is in a cache and if a first elapsed time since a first previous request for the content is less than a first threshold;
storing the first elapsed time in a table indexed by a content identifier;
if the content is determined to not be in the cache and if the first elapsed time is less than the first threshold:
retrieving the content;
storing the content in the cache; and
providing the content to the client;
determining a second threshold based on the content requested and based on the cache; and
if the content is determined to not be in the cache and a second elapsed time since a second previous request for the content is greater than the second threshold:
obtaining the content for the client without caching the content.

\* \* \* \* \*